(12) United States Patent
Mei

(10) Patent No.: US 7,751,149 B1
(45) Date of Patent: *Jul. 6, 2010

(54) LIMITER STRUCTURE WITH REDUCED VERTICAL EXTENT FOR LOW PROFILE DISK DRIVE SUSPENSIONS

(75) Inventor: Shijin Mei, Temecula, CA (US)

(73) Assignee: Magnecomp Corporation, Murrieta, CA (US)

( * ) Notice: Subject to any disclaimer, the term of this patent is extended or adjusted under 35 U.S.C. 154(b) by 950 days.

This patent is subject to a terminal disclaimer.

(21) Appl. No.: 10/866,364

(22) Filed: Jun. 11, 2004

Related U.S. Application Data

(63) Continuation of application No. 10/007,897, filed on Nov. 6, 2001, now Pat. No. 6,791,798.

(60) Provisional application No. 60/324,906, filed on Sep. 25, 2001.

(51) Int. Cl.
*G11B 5/48* (2006.01)

(52) U.S. Cl. .................................. 360/245.7

(58) Field of Classification Search ............... 360/245.7
See application file for complete search history.

(56) References Cited

U.S. PATENT DOCUMENTS

| 5,333,085 | A | * | 7/1994 | Prentice et al. | 360/245.7 |
|---|---|---|---|---|---|
| 5,987,733 | A | * | 11/1999 | Goss | 29/603.03 |
| 6,046,883 | A | * | 4/2000 | Miller | 360/245.7 |
| 6,069,773 | A | * | 5/2000 | Frater et al. | 360/245.7 |
| 6,172,853 | B1 | * | 1/2001 | Davis et al. | 360/245.7 |
| 6,243,235 | B1 | * | 6/2001 | Fu et al. | 360/245.7 |
| 6,320,729 | B1 | * | 11/2001 | Coon | 360/245.7 |
| 6,424,498 | B1 | * | 7/2002 | Patterson et al. | 360/245.7 |
| 6,538,850 | B1 | * | 3/2003 | Hadian et al. | 360/245.7 |
| 6,791,798 | B1 | * | 9/2004 | Mei | 360/245.7 |
| 7,130,157 | B2 | * | 10/2006 | Sassine et al. | 360/245.7 |
| 2004/0032695 | A1 | * | 2/2004 | Sassine et al. | 360/245.7 |

\* cited by examiner

*Primary Examiner*—David D Davis
(74) *Attorney, Agent, or Firm*—Intellectual Property Law Offices of Joel Voelzke, APC

(57) ABSTRACT

A disk drive suspension and method with a low profile limiter structure located within the vertical extent of the slider, the tongue free and any gap provided by the limiter structure so as to not increase the overall vertical extent of the suspension. The limiter structure has a tab separated on three sides from the suspension beam portion and extending from the beam portion locus toward the suspension tongue portion free end. The tab has a projecting shoulder spaced at a gap from the beam portion. The tongue free end outer terminus has an opening that interfits with the tab in tab shoulder engaging relation to block free end movement away from the locus beyond that permitted by the gap.

19 Claims, 3 Drawing Sheets

LIMITER STRUCTURE WITH REDUCED VERTICAL EXTENT FOR LOW PROFILE DISK DRIVE SUSPENSIONS

RELATED APPLICATION

This application is a continuation of U.S. application Ser. No. 10/007,897, filed Nov. 6, 2001, now U.S. Pat. No. 6,791, 798 which claims the benefit of U.S. Provisional Application Ser. No. 60/324,906, filed Sep. 25, 2001.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention relates to the disk drive suspensions having limiters against undue movement of the slider-carrying tongue from the suspension beam portion. In a particular aspect, the invention provides a reduced vertical extent limiter structure that effectively blocks slider contact with the opposing disk upon shock events and the like.

The invention achieves limited vertical extent in the limiter structure by using the space already dedicated to the slider and tongue and no more except for the limit gap to provide a limiter structure that does not increase the vertical profile of the suspension. The invention is thus especially useful in the most compact head disk assemblies.

2. Description of the Related Art

Numerous limiters have been proposed and many are in use. In general, all limiters constrain some movement of the tongue-carried slider by stopping unwanted tongue movement against the beam portion or the flexure itself using an added element that traverses the space between the tongue and the flexure or beam portion. Known limiters increase the overall height of the suspension assembly by using elements that project out of the plane of the suspension, e.g. above (or below) the flexure or beam portion to engage the same.

BRIEF SUMMARY OF THE INVENTION

It is an object of the present invention to provide an improved head disk assembly. It is a further object to provide a head disk assembly suspension with a limiter feature but within the original plane of the suspension, useful in microactuated and other suspensions. It is another object of the invention to provide a limiter structure and limiter method that use the space already dedicated to the tongue and slider for locating the limiter structure. Another object is the provision of a limiter structure that projects out of the plane of the beam portion toward the tongue free end and that blocks the undue movement of the tongue beyond a predetermined gap, the limiter structure having a vertical extent no greater than the combined vertical extents of the tongue free end, the slider and the predetermined gap. Other objects include providing supplementary limiters on the flexure frame, a dimple defined by an etched and deflected part of the beam portion, and a front end lifter formed on the beam portion.

These and other objects of the invention to become apparent hereinafter are realized in a disk drive suspension adapted for low profile head disk assemblies with limited vertical space, the suspension comprising a base portion, a spring portion, and a beam portion, a flexure supported by the beam portion and having a frame and a tongue extending from the frame to have a free end opposite a locus on the beam portion at a predetermined gap, a slider carried by the tongue free end, the beam portion, the gap and the slider having a combined vertical extent, a low profile limiter structure at the locus, the limiter structure being sized to not exceed in its vertical extent the combined vertical extent, the free end defining cooperating structure that interengages with the limiter structure against undue travel of the free end relative to the beam portion.

In this and like embodiments, typically, the flexure is separately formed from the beam portion and fixed thereto, the gap is about 0.002 inch in vertical extent, the limiter structure does not exceed about 0.004 inch, the limiter structure has a shank portion and a head extending outward from the shank portion, the shank portion passing the cooperating structure in head interengageable relation with the free end, the limiter structure comprises a tab, and the cooperating structure comprises a slot interfitting with the tab in free end engageable relation with the tab, the beam is etched at the locus to define the limiter structure, the locus is generally rectangular, the locus being etched to define a hook-shaped limiter in the plane of the beam portion, the limiter structure being bent from the plane of the beam portion to intersect the plane of the free end in cooperating structure engageable relation, the hook-shaped limiter is T-shaped, the beam portion defines an edge shoulder, the flexure defining a cooperating projection rearward of the free end terminus that engages the edge shoulder in free end movement limiting relation, the beam portion further defines left and right edge shoulders, the flexure defining cooperating projections rearward of the free end terminus that engage the edge shoulders in flexure or free end movement limiting relation and/or the load beam is etched to define a dimple opposite the slider.

In a further embodiment the invention provides a suspension as described and in which the flexure has an open frame, and a tongue cantilevered from the frame to have a free end opposite a locus on the beam portion, the free end having an outer terminus, a slider carried by the tongue free end inward of the outer terminus, a low profile limiter structure comprising a tab separated on three sides from the beam portion and extending from the beam portion locus toward the free end, the tab having a projecting shoulder spaced at a gap from the beam portion, the free end outer terminus having an opening that interfits with the tab in tab shoulder engaging relation to block free end movement away from the locus beyond that permitted by the gap.

In this and like embodiments, typically, the foregoing features are provided and the flexure is formed separately from the beam portion, and is disposed in an adjacent plane generally parallel with the beam portion plane, the flexure frame has left and right outriggers and a cross-member therebetween surrounding an opening, the tongue being cantilevered from the cross member to extend into the opening, the limiter structure has a shank portion and a head extending outward from the shank portion, the shank portion passing the cooperating structure in head interengageable relation with the free end, the limiter structure comprises a tab, and the cooperating structure comprises a slot interfitting with the tab in free end engageable relation with the tab, the beam portion is etched at the locus to define the limiter structure, the beam portion defines an edge shoulder, the flexure defines a cooperating projection rearward of the free end terminus that engages the edge shoulder in free end movement limiting relation, or the beam portion further defines left and right edge shoulders, the flexure defining cooperating projections rearward of the free end terminus that engage the edge shoulders in free end movement limiting relation.

In its method aspects the invention provided a method of blocking in a head disk assembly undue movement beyond a predetermined gap of a flexure tongue and slider away from the beam portion of a suspension without increasing the vertical extent of the suspension, including deflecting from the beam portion and opposite the longitudinal axis of the tongue a limiter structure having a shape that predetermines the gap, limiting the vertical extent of the limiter structure to not greater than the combined vertical extent of the beam portion, the slider and the gap, and interengaging the limiter structure with the tongue against tongue movement greater than allowed by the gap.

In this and like embodiments, typically, the method also includes etching the limiter structure from the beam portion on three sides to have a hook shape in its deflected condition, selectively engaging a lateral region of the flexure tongue with an opposing lateral region of the beam portion at one or more locations spaced from the limiter structure upon undue movement of the tongue from the beam portion, and also defining a dimple in the beam portion between opposed lateral regions thereof to engage the tongue portion in slider gimballing relation.

BRIEF DESCRIPTION OF THE SEVERAL VIEWS OF THE DRAWINGS

The invention will be further described in conjunction with the attached drawings in which.

DETAILED DESCRIPTION OF THE INVENTION

Figure 1:
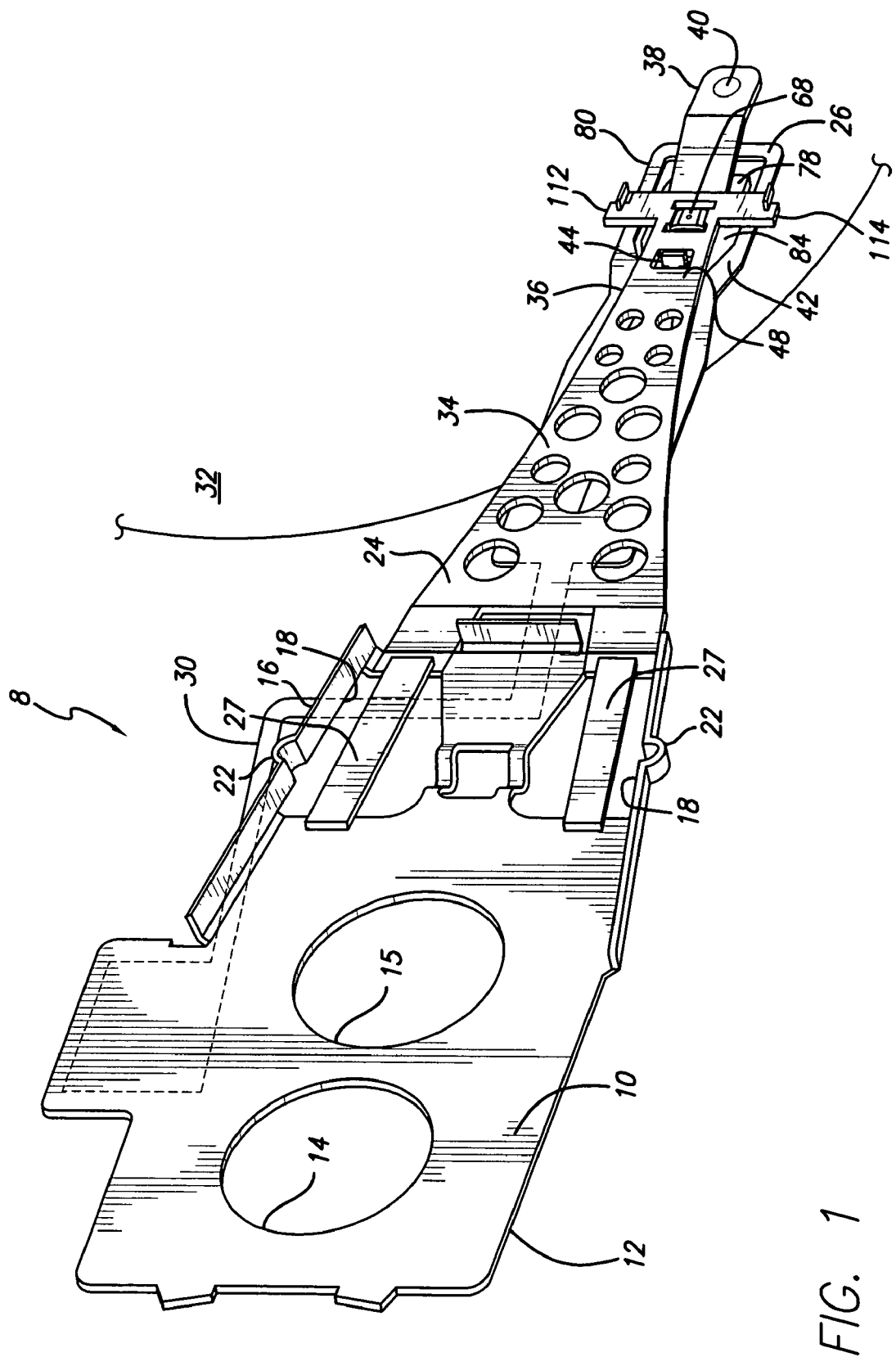
FIG. 1 is an oblique view of a disk drive suspension according to the invention.
Figure 2:
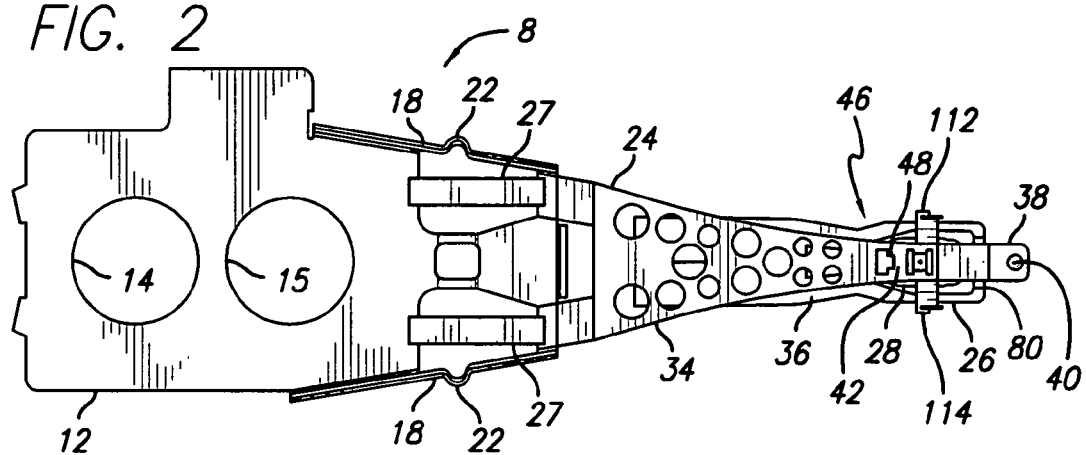
FIG. 2 is a top plan view thereof.
Figure 3:
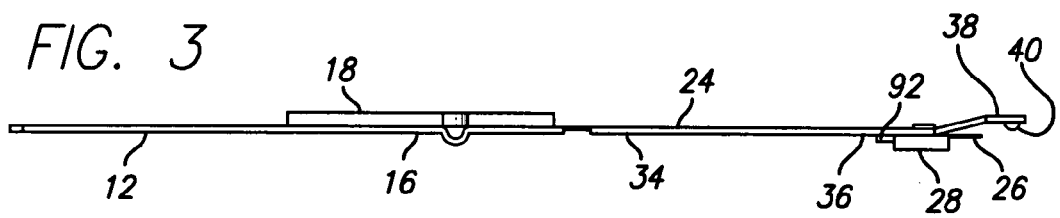
FIG. 3 is a side elevation view thereof.

With reference now to the drawings in detail in FIGS. 1-6, the invention head disk assembly 8 includes a suspension shown at 10 and comprising a base portion 12 having opening 14 to receive a mounting plate boss (not shown) for attachment to an actuator arm (not shown). Opening 15 serves to lighten the suspension 10. Suspension 10 further comprises a spring portion 16 shown as two spring arms 18 with arcuate deflections 22 that enable ready compliance with microactuation forces horizontally but maintain high rigidity in the vertical plane and in resistance to torque. Spring arms 18 connect to the suspension beam portion 24, a relatively rigid element suited for carrying a flexure 26 and its slider 28 in operating proximity to a storage medium disk 32. Microactuators 27 are mounted across the spring portion 16 from the base portion 12 to the rigid beam portion 24 extending between the spring arms 18, or otherwise coupling the base portion and the beam portion directly or indirectly, for shifting the beam portion relative to the base portion. A flexible circuit 30 mostly omitted in the views for clarity of illustration, is provided to electrically couple the heads within slider 28 with the device electronics (not shown).

Figure 4:
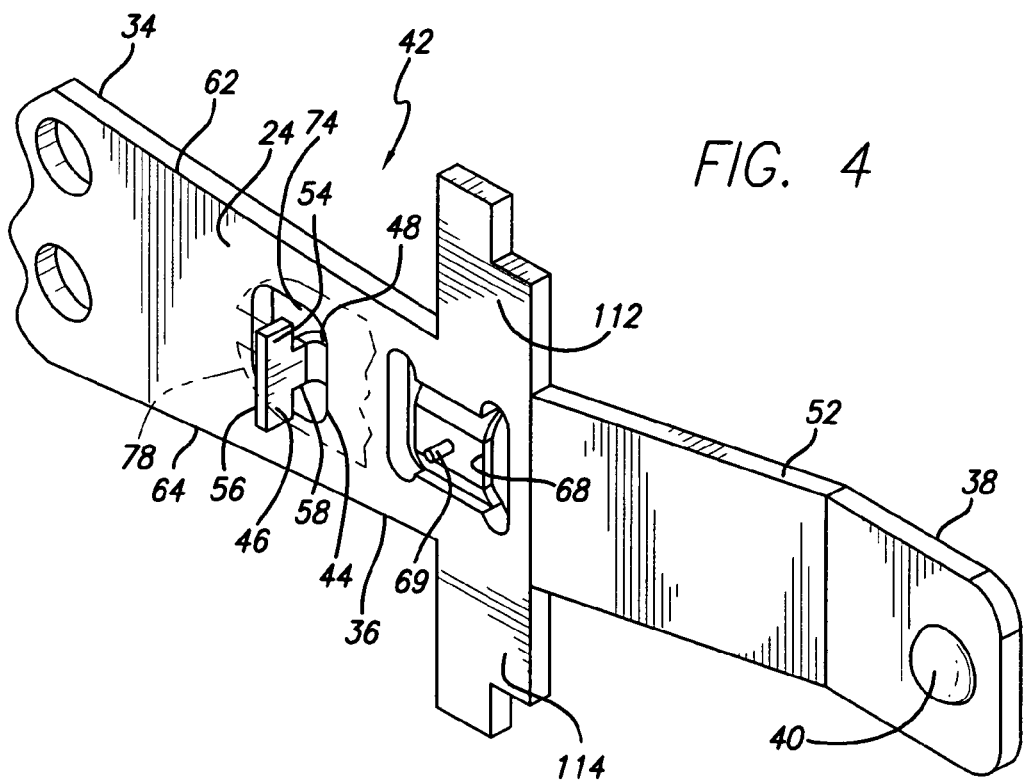
FIG. 4 is an oblique, fragmentary view of the suspension beam portion.

With particular reference to FIG. 4, the rigid portion 24 is shown in more detail and as formed before assembly into the invention suspension. Rigid portion 24 comprises proximally a beam section 34 and distally a distal section 36 having an integral front end lift tip 38 that is deflected out of the general plane of the rigid portion, see FIG. 3, and defines protuberant cam contact 40. Rigid portion 24 further has a locus 42 in its distal section 36 that is shown as it appears after etching an aperture 44 there. Aperture 44 is formed by etching a hook-shaped tab 46 from the metal of distal section 36 at the locus by freeing the tab on three sides as shown. Tab 46 is thus formed to comprise a shank 48 that remains on one end connected to the locus wall edge margin surrounding the aperture 44. Tab 46 further comprises a head 54 surmounting the shank 48. Head 54 is formed as a projecting shoulder 56 at the top end 58 of the shank 48. Shoulder 56 projects laterally off the shank 48 toward the right or left edge 62, 64, respectively of the distal section 36 to define a hood shape, or toward each edge to define a T-shaped hook shape (shown). Tab 46 is bent out of the general plane of the distal section 36, as shown, to be angled downward (toward the slider 28 side of the flexure 26) at an angle ranging from about 60 to about 90 degrees to the distal section 36 plane so as to intercept the flexure tongue 78 as will be described.

Figure 5:
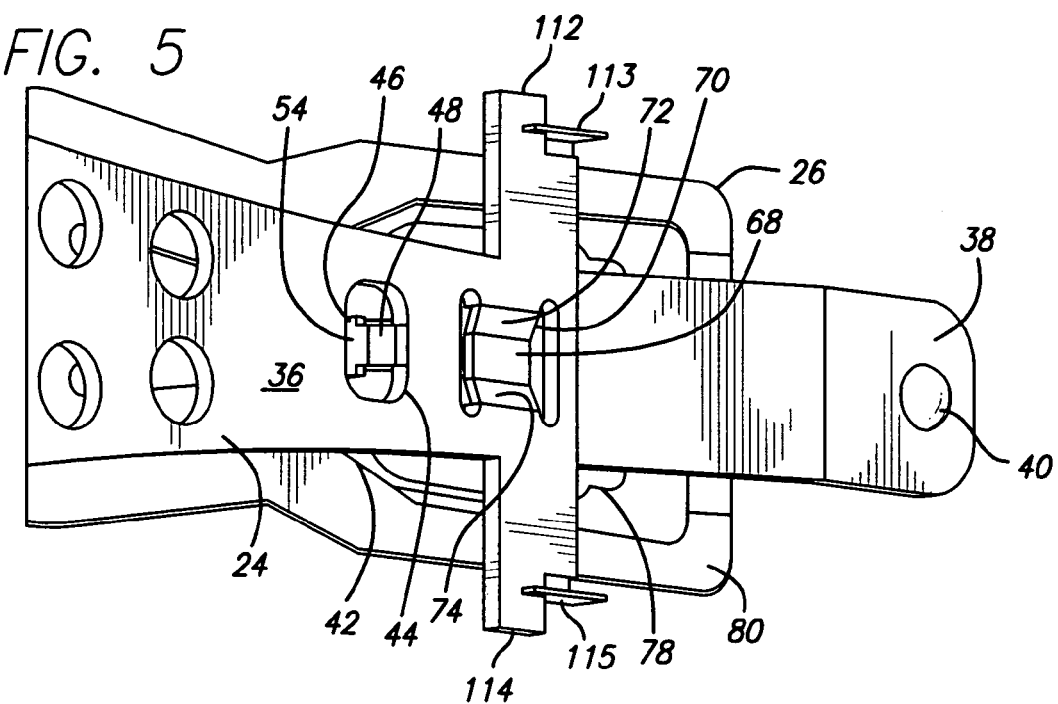
FIG. 5 is an oblique, fragmentary top plan view of the beam portion and flexure assembled; and, FIG. 6 is an oblique, fragmentary bottom plan view of the beam portion and flexure assembled.

Rigid portion distal section 36 further defines a dimple 68. As best shown in FIG. 5, region 70 of the distal section 36 is partially separated from the section as by etching to have two sides, such as lateral sides 72, 74, remain connected to the surrounding section, and its center outermost part 76 deflected from its original locus to extend outward and toward the slider 28, so that outermost part 76 lies below the lower side plane of the surrounding distal section 36, Dimple 68 has post 69 formed in the outermost part 76 (FIG. 4) to engage flexure tongue 78 and provide a gimballing locus for the slider 28.

As can be seen for example in FIG. 4. both head 54 and top end 58 of shank 48 generally lie in the same plane, that is, are generally coplanar with each other even after tab 46 is bent into the opening of the flexure tongue 78. The limiter is therefore a generally planar limiter.

Figure 6:
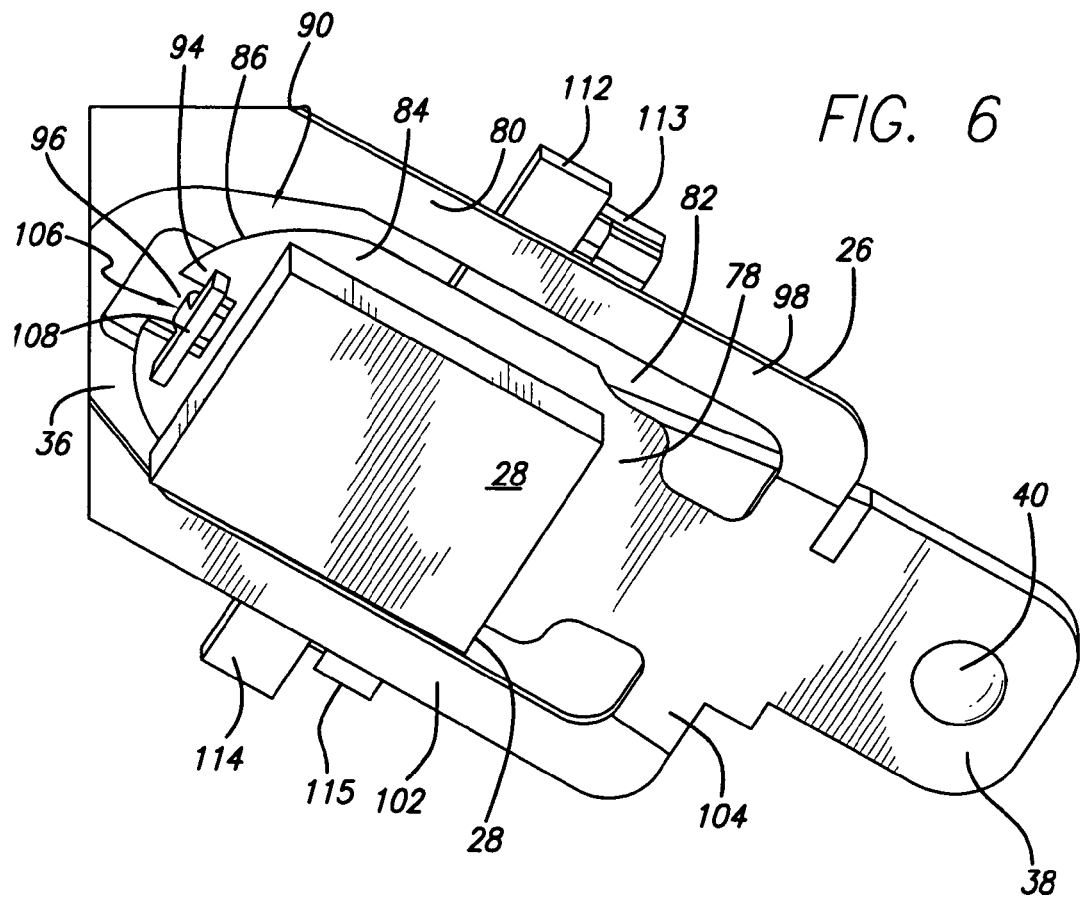

Rigid portion distal section 36 also has right and left projecting shoulders 112, 114 for additional flexure 26 travel limitation as will be described As best shown in FIGS. 5 and 6, the suspension 10 has the suitably separately formed flexure 26 disposed in an adjacent plane generally parallel with the plane of the distal section 36 and having an open frame 80 defining a frame center opening 82. The flexure frame 80 has left and right outriggers 98, 102 and a cross-member 104 therebetween surrounding the center opening 82. Tongue 78 is cantilevered from the cross member 104 to extend into the opening 82 and have its free end 84 opposite beam portion locus 42. Free end 84 has a split or notched outer terminus 86. Slider 28 is carried by the tongue free end 84 inward of the outer terminus 86.

The invention provides a novelly reduced profile limiter structure 90 by having the tab 46 extend only into the space 92 (FIG. 3) that is already dedicated to the presence of the slider 28, beam section 36 and a gap 94 that the limiter provides before blocking tongue 78 movement.

Thus, limiter structure 90 comprising the tab 46 extends from the beam portion locus 42 toward the tongue free end 84. Tab projecting shoulder 56 is spaced at the gap 94 from the beam portion distal section 36. Free end outer terminus 86 has the split or notched opening 96 that interfits with the shank 48 of tab 46 in tab shoulder 56 engaging relation to block free end 84 movement away from the locus 42 beyond that permitted by the gap 94. Limiter structure 90 includes tab shank 48 and its head 54 extending outward from the shank. Shank 48 passes the cooperating structure 106 (e.g. opening 96) formed at the flexure tongue outer end 86 to be head 54-interengageable for engaging the tab 46 to the tongue free end 84. Where the limiter structure 90 comprises tab 46, suitably the cooperating structure 106 comprises the open-ended (or closed) opening 96 formed as notch or slot 108 and located and sized to interfit with the tab shank 48 in free end 84 engageable relation with the tab 46. As noted above, beam portion distal section 36 is etched at the locus 42 to define the limiter structure 90.

For other or additional travel limiting, distal beam portion 36 defines edge shoulders 112, 114. Flexure frame outriggers 98, 102 define cooperating hook-like projections 113, 115 rearward of the tongue free end terminus 86 that are arranged to engage as by interfittment with the edge shoulders 112, 114 in flexure frame 80 and thus, as well, tongue free end 84 movement limiting relation.

The low profile limiter 90 does not exceed in its vertical extent (assuming suspension 10 to be horizontal) the beam portion 24, gap 94 and the slider 28 combined vertical extent, or, preferably, more than about 80% of that combined vertical extent.

The gap 94 typically is from about 0.0015 to about 0.003 inch, and preferably about 0.002 inch, in vertical extent. Limiter structure 90 typically does not exceed about 0.003 to about 0.006 inch and is preferably about 0.004 inch in vertical extent, so that with the beam portion thickness or vertical extent being about 0.003 inch, and the slider being about 0.012 inch, the low profile limiter 90 extends less than about 80% of the combined vertical extents of the beam 24, the slider 28 and the gap 94, and will not contact the disk 32 even when fully depressed toward the disk.

The invention method of blocking in head disk assembly 8 undue movement beyond a predetermined gap 94 of a flexure tongue 78 and slider 28 away from the beam portion 24 of a suspension 10 without increasing the vertical extent of the suspension, includes deflecting from the beam portion 24 and opposite the longitudinal axis of the tongue 78 a limiter structure 90 having a shape that predetermines the gap, limiting the vertical extent of the limiter structure to not greater than the combined vertical extent of the beam portion, the slider and the gap, and interengaging the limiter structure with the tongue against tongue movement greater than allowed by the gap.

The invention thus provides an improved head disk assembly and assembly suspension with a limiter feature within the original plane of the suspension to be useful in microactuated and other, especially very compact suspensions. The invention limiter structure and limiter method use the space already dedicated to the tongue and slider for locating the limiter structure that projects out of the plane of the beam portion toward the tongue free end and that blocks the undue movement of the tongue beyond a predetermined gap. The limiter structure has a vertical extent no greater than the combined vertical extents of the tongue free end, the slider and the predetermined gap. The invention further provides supplementary limiters on the flexure, a dimple defined by an etched and deflected part of the beam portion, and a front end lifter formed on the beam portion.

The foregoing objects are thus met.

I claim:

1. A disk drive suspension adapted for low profile head disk assemblies with limited vertical space, said suspension comprising a base portion, a spring portion, and a beam portion defining a low profile limiter structure extending from one side of said beam portion, a flexure supported by said beam portion, a slider carried by said flexure, said limiter structure being sized to not extend vertically beyond said slider, said flexure having an opening therein, said limiter structure having a shank portion and a head attached thereto and generally coplanar with a top end of said shank portion, said shank portion extending away from said beam portion and into said flexure opening, said shank portion and head together restraining undue movement of said flexure in at least two directions, a distalmost end of the limiter structure lying within a thickness of the slider.

2. The disk drive suspension according to claim 1, in which said flexure is separately formed from said beam portion and fixed thereto.

3. The disk drive suspension according to claim 1, in which said flexure has a tongue extending at a gap of about 0.002 inch in vertical extent from said beam portion.

4. The disk drive suspension according to claim 1, in which said limiter structure does not exceed about 0.004 inch in vertical extent.

5. The disk drive suspension according to claim 1, in which said beam is etched to define said limiter structure.

6. The disk drive suspension according to claim 1, wherein said at least two directions includes a first direction away from said beam portion.

7. The disk drive suspension according to claim 6, wherein said at least two directions further includes a second direction laterally perpendicular to a longitudinal axis of said beam portion.

8. The disk drive suspension according to claim 7, wherein said at least two directions further includes a third direction laterally perpendicular to the longitudinal axis of said beam portion opposite to said second direction.

9. A disk drive suspension adapted for low profile head disk assemblies with limited vertical space, said suspension comprising a base portion, a spring portion, and a beam portion, a flexure supported by said beam portion and having a frame and a tongue extending from said frame to have a free end opposite a locus on said beam portion at a predetermined gap, a slider carried by said tongue free end, said beam portion, said gap and said slider having a combined vertical extent, a low profile limiter structure at said locus, said limiter structure being sized to not extend vertically beyond said slider, said free end defining a cooperating structure that interengages with said limiter structure against undue travel of said free end relative to said beam portion in both a vertical and a horizontal direction, said locus being generally rectangular and etched to define a hook-shaped limiter in the plane of said beam portion, said limiter structure having a shank portion and a head attached thereto and being bent from the plane of said beam portion to intersect the plane of said free end in cooperating structure engageable relation with said generally planar hook-shaped limiter extending through an opening in said tongue free end with said head being generally coplanar with a top end of said shank portion, a distalmost end of the limiter structure lying with in a thickness of the slider.

10. The disk drive suspension according to claim 9, in which said hook-shaped limiter is T-shaped.

11. The disk drive suspension according to claim 9 wherein:
said tongue free end has a slot formed therein, the slot defining a flexure slot; and
said limiter structure comprises a shank and a head, the head being wider than the shank and wider than the flexure slot, the shank being bent to extend into the flexure slot such that the head is disposed on a side of the flexure opposite the beam portion.

12. The disk drive suspension according to claim 11 wherein:
the flexure is restrained in movement in a vertical direction by the head of the limiter being wider than the flexure slot; and
the flexure is restrained in horizontal movement, in both a first horizontal direction and in a second horizontal direction opposite the first horizontal direction, by the shank extending into the flexure slot.

13. A disk drive suspension adapted for low profile head disk assemblies with limited vertical space, said suspension comprising a base portion, a spring portion, and a beam portion, a flexure supported by said beam portion and having a frame and a tongue extending from said frame to have a free end opposite a locus on said beam portion at a predetermined gap, a slider carried by said tongue free end, said beam portion, said gap and said slider having a combined vertical extent, a low profile limiter structure at said locus, said limiter structure being sized to not extend vertically beyond said slider, said free end defining a cooperating structure that interengages with said limiter structure against undue travel of said free end relative to said beam portion said locus being generally rectangular and etched to define a hook-shaped limiter in the plane of said beam portion, said limiter structure being bent from the plane of said beam portion to intersect the plane of said free end in cooperating structure engageable relation, and in which said limiter structure comprises a tab having a shank portion and a head attached thereto, and said cooperating structure comprises a slot inter-fitting with said tab in free end engageable relation with said tab, said slot surrounding said tab on at least three sides, said head being generally coplanar with a top end of said shank portion, a distalmost end of the limiter structure lying within a thickness of the slider.

14. A method of blocking in a head disk assembly undue movement beyond a predetermined gap of a flexure tongue and slider away from the beam portion of a suspension without increasing the vertical extent of the suspension, including forming from said load beam a limiter structure comprising a shank portion and a projecting shoulder that is generally coplanar with a top end of said shank portion, deflecting from said beam portion and toward the longitudinal axis of said tongue said limiter structure in a shape that predetermines said gap, positioning the limiter structure through a slot in said tongue, the slot surrounding said limiter structure on at least three sides, limiting the vertical extent of said limiter structure to not extend vertically beyond said slider, and interengaging said limiter structure with said tongue against tongue movement greater than allowed by said gap, a distalmost end of the limiter structure lying within a thickness of the slider.

15. The method of claim 14 wherein said shank portion extends through the slot in the tongue, and the projecting shoulder abutting against the tongue to limit undue movement of the tongue away from the beam portion.

16. A disk drive suspension comprising:
a base portion;
a spring portion affixed to the base portion;
a beam portion affixed to the spring portion;
a flexure supported by the beam portion, the flexure having an elongated opening formed therein;
a slider carried by the flexure;
wherein the beam portion includes a low profile limiter structure extending vertically from one side of the beam portion through the elongated opening in the flexure and not extending vertically beyond the slider, the generally planar limiter structure having at a distal end thereof a projecting shoulder that is generally coplanar with a top end of a shank portion of said limiter, the projecting shoulder extending horizontally to limit vertical movement of the flexure, the elongated opening surrounding the limiter structure on three sides, a distalmost end of the limiter structure lying within a thickness of the slider.

17. The disk drive suspension of claim 16 wherein the elongated opening is a slot formed in an end of the flexure, and the limiter structure is a tab that is formed from the beam portion and thereafter bent downward, the tab extending through the slot in the flexure.

18. A disk drive suspension adapted for low profile head disk assemblies with limited vertical space, said suspension comprising:
a base portion, a spring portion, and a beam portion defining a low profile limiter structure extending from one side of said beam portion;
a flexure supported by said beam portion; and
a slider carried by said flexure;
wherein:
said limiter structure is sized to not extend vertically beyond said slider;
said flexure has a slot formed therein, the slot defining a flexure slot; and said limiter structure comprises a shank and a head, the head being wider than the shank and wider than the flexure slot, the shank extending away from said beam portion and into the flexure slot such that the head is disposed on a side of the flexure opposite the beam portion and is generally coplanar with a top end of said shank, a distalmost end of the limiter structure lying within a thickness of the slider.

19. The disk drive suspension according to claim 18 wherein:
the flexure is restrained in movement in a vertical direction by the head of the limiter being, wider than the flexure slot; and
the flexure is restrained in horizontal movement, in both a first horizontal direction and in a second horizontal direction opposite the first horizontal direction, by the shank extending into the flexure slot.

* * * * *

UNITED STATES PATENT AND TRADEMARK OFFICE
CERTIFICATE OF CORRECTION

PATENT NO. : 7,751,149 B1  Page 1 of 1
APPLICATION NO. : 10/866364
DATED : July 6, 2010
INVENTOR(S) : Shijin Mei It is certified that error appears in the above-identified patent and that said Letters Patent is hereby corrected as shown below:

In claim 19, column 8, line 48, after "being" delete ","

Signed and Sealed this

Seventeenth Day of August, 2010

David J. Kappos
*Director of the United States Patent and Trademark Office*